(12) United States Patent
Kai

(10) Patent No.: US 10,692,075 B2
(45) Date of Patent: Jun. 23, 2020

(54) PORTABLE TERMINAL, CONTROL METHOD, AND NON-TRANSITORY INFORMATION RECORDING MEDIUM

(71) Applicant: Rakuten, Inc., Tokyo (JP)

(72) Inventor: Kikumi Kai, Tokyo (JP)

(73) Assignee: Rakuten, Inc., Tokyo (JP)

( * ) Notice: Subject to any disclaimer, the term of this patent is extended or adjusted under 35 U.S.C. 154(b) by 255 days.

(21) Appl. No.: 15/678,216

(22) Filed: Aug. 16, 2017

(65) Prior Publication Data
US 2018/0101843 A1    Apr. 12, 2018

Related U.S. Application Data

(63) Continuation-in-part of application No. PCT/JP2015/054333, filed on Feb. 17, 2015.

(51) Int. Cl.
*G06Q 20/10* (2012.01)
*G06Q 20/20* (2012.01)
*G06Q 40/00* (2012.01)
*G06Q 40/02* (2012.01)
*G06Q 20/36* (2012.01)
*G06Q 20/32* (2012.01)
*G06Q 20/06* (2012.01)
*G06Q 20/34* (2012.01)
*G06Q 20/22* (2012.01)

(52) U.S. Cl.
CPC ..... *G06Q 20/3678* (2013.01); *G06Q 20/0655* (2013.01); *G06Q 20/20* (2013.01); *G06Q 20/32* (2013.01); *G06Q 20/3278* (2013.01); *G06Q 20/352* (2013.01); *G06Q 20/36* (2013.01); *G06Q 20/22* (2013.01)

(58) Field of Classification Search
CPC ........ G06Q 20/10; G06Q 20/20; G06Q 40/00; G06Q 40/02
USPC .......................................... 705/39
See application file for complete search history.

(56) References Cited

U.S. PATENT DOCUMENTS

2014/0379566 A1* 12/2014 Akashika ............... G06Q 20/32
                                                         705/39

FOREIGN PATENT DOCUMENTS

JP    2013-140453 A    7/2013

OTHER PUBLICATIONS

International Search Report for PCT/JP2015/054333, dated Apr. 7, 2015.

* cited by examiner

*Primary Examiner* — Hai Tran
(74) *Attorney, Agent, or Firm* — Sughrue Mion, PLLC

(57) ABSTRACT

A terminal device can receive application for purchase from a user and comprises a prompter, a setter, and a payment processor. As application for purchase is made by a user, the prompter prompts the user to enable near field communication between a transportable device to be used for making a payment of an electronic value that is paid for a price and the portable terminal. As the near field communication between the transportable device and the portable terminal is enabled, the setter sets any of actions to the portable terminal that are detectable by the portable terminal. The prompter presents the set action for the user to perform. As performance of the presented action to the portable terminal is detected, the payment processor receives the payment of an electronic value from an account associated with the transportable device via the near field communication.

19 Claims, 12 Drawing Sheets

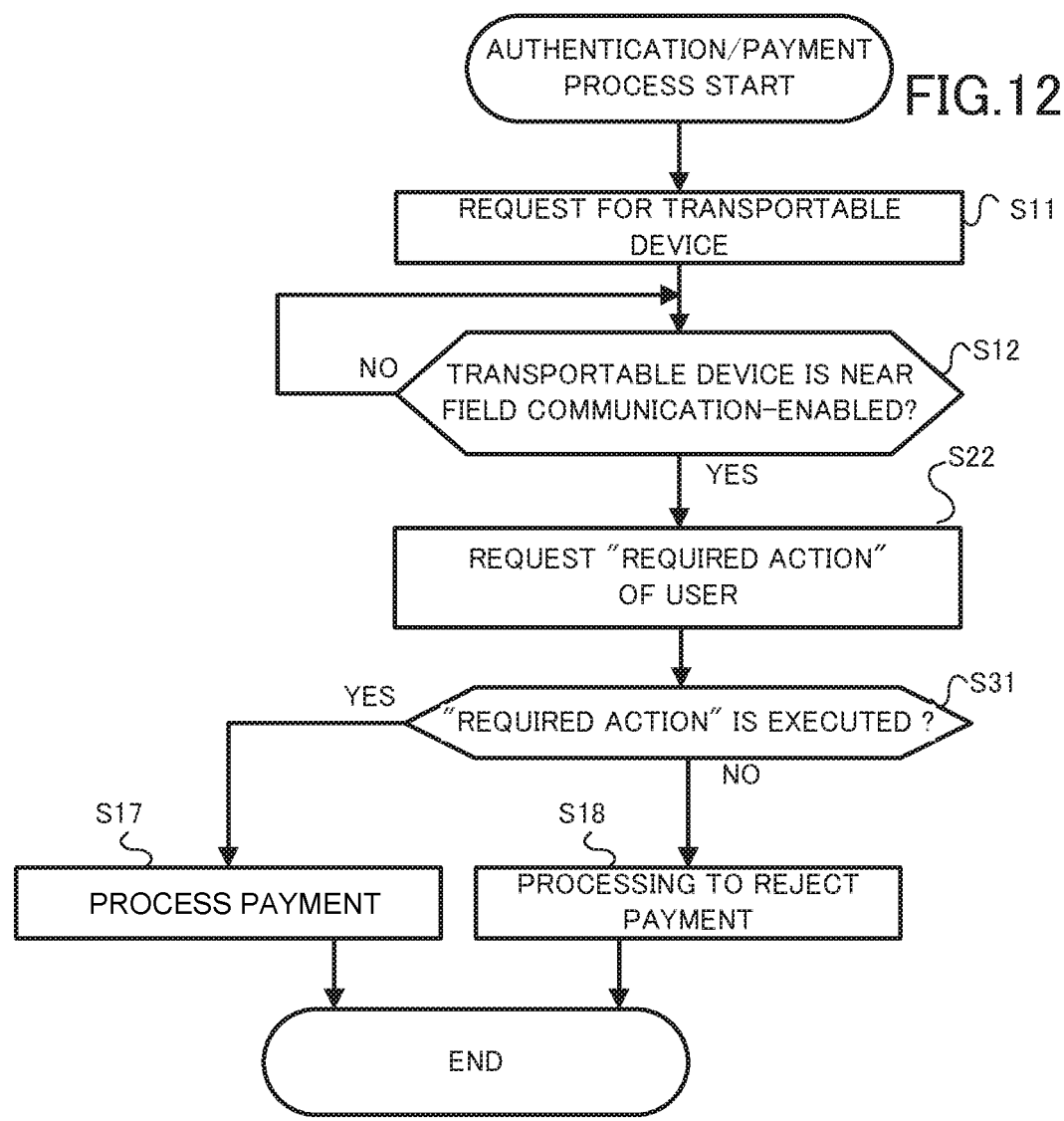

PORTABLE TERMINAL, CONTROL METHOD, AND NON-TRANSITORY INFORMATION RECORDING MEDIUM

FIELD

The present disclosure relates to a portable terminal, a control method, and a non-transitory information recording medium.

BACKGROUND

Various systems for using electronic money in transactions to pay a price to receive a product or a service have been proposed. In an electronic money system, instead of carrying cash in a wallet, a payment is made by an electronic value associated with a transportable device (which corresponds to a wallet) and expressed by electronic information (which corresponds to cash in the wallet).

For making a paying by an electronic value, the payer places and keeps his transportable device near the reader/writer operated by the provider of a product or a service for a short time to establish near field communication (NFC) between the transportable device and the reader/writer, and reduce the electronic value associated with the transportable device by a paid amount through the communication. In the NFC, the transportable device and the reader/writer do not need to make contact; however, typically, they have to be brought to several mm of each other.

As the transportable device, ATM cards and credit cards in which an NFC electronic circuit is incorporated are widely used. The electronic circuit generally operates with electric power generated by electromagnetic induction due to NFC electric waves emitted by the reader/writer.

On the other hand, as the portable terminal such as cellphones and smartphones, those in which an NFC electronic circuit is incorporated like the above are also widely used and furthermore, telephone communication subscriber identity (SIM) cards in which the NFC communication function is provided have been proposed. In such a case, the electric waves emitted by the reader/writer can be used as a power supply and furthermore, the power can be supplied by the battery provided to the main body of the portable terminal.

Here, an NFC electronic circuit that can be powered by the portable terminal main body often has (a) a card emulation mode for working as a transportable device for charging/withdrawing an electronic value in/from an account assigned to the electronic circuit, (b) a reader/writer mode for processing information regarding an electronic value assigned to another transportable device and functioning as a reader/writer, and (c) a peer-to-peer (P2P) mode for electronic circuits to mutually transmit/receive various messages such as email addresses.

In other words, the portable terminal such as cellphones and smartphones can not only function as a wallet for electronic money but also function as a reader/writer. Using this function, a technique of making a portable terminal function as a reader/writer of an electronic money system and placing an electronic money card near the portable terminal to establish the communication and pay an electronic value from the electronic money card is proposed (see the paragraphs 0072 and 0073 of Patent Literature 1).

With the above function, the owner of a private business store can receive a payment by an electronic value from a customer with low capital investment cost by making a portable terminal he uses for telephone calls as a reader/writer of an electronic money system. To do so, the owner downloads a portable terminal program from a distribution server of an electronic money business operator and executes the program on his portable terminal.

Additionally, in various kinds of entertainment facilities such as theaters and baseball stadiums, venders walk around spectators' seats to sell drinks and brochures. Then, if the seller purchases a number of inexpensive old-model smartphones, installs the above program onto them, and makes the vendors operate, the spectators can make payments by electronic money.

Patent Literature 1: Unexamined Japanese Patent Application Kokai Publication No. 2013-140453.

SUMMARY

However, as various types of portable terminals become usable as a reader/writer for electronic money, facile wrongful use may become possible. For example, a portable terminal working as a reader/writer may be placed near someone else's bag in a downtown crowd or on a public transportation such as a bus and a train to steal an electronic value from a transportable device in the bag. Thus, there is a strong demand for a technique for suppressing such wrongful use.

The present disclosure is intended to solve the above problem and an objective of the disclosure is to provide a portable terminal for an operator to present to a payer of an electronic value that is suitable for suppressing wrongful use of someone else's transportable device, a control method of the portable terminal, and a non-transitory computer-readable information recording medium on which a program making a computer function as the above portable terminal is recorded.

In order to achieve the above objective, according to the present disclosure, a portable terminal receiving application for purchase from a user prompts the user to enable near field communication between a transportable device to be used for making a payment of an electronic value that is paid for a price and the portable terminal when application for purchase is made by the user, acquires identification information of the transportable device and sets a length of holding time based on a rarity of acquisition of the identification information by the portable terminal up to then as the near field communication is enabled, and receives the payment of an electronic value from an account associated with the transportable device via the near field communication as the time duration of the enabled near field communication is equal to or longer than a holding time.

Moreover, in order to achieve the above objective, according to the present disclosure, a portable terminal receiving application for purchase from a user prompts the user to enable near field communication between a transportable device to be used for making a payment of an electronic value that is paid for a price and the portable terminal when application for purchase is made by the user, acquires identification information of the transportable device and sets a required action of the user based on a rarity of acquisition of the identification information by the portable terminal up to then as the near field communication is enabled, presents the set required action to the user, and receives the payment of an electronic value from an account associated with the transportable device via the near field communication as execution of the set action is detected.

Moreover, in order to achieve the above objective, according to the present disclosure, a portable terminal prompts enabling of near field communication between a transportable device to be used for making a payment of an electronic value that is paid for a price and the portable terminal, sets any of actions to the portable terminal that are detectable by the portable terminal prior to execution of the payment as the near field communication is enabled, presents the set action, and receives the payment of an electronic value from an account associated with the transportable device via the near field communication as performance of the presented action is detected.

Moreover, in order to achieve the above objective, on the non-transitory computer-readable information recording medium according to the present disclosure, a program making a computer function as parts of the above portable terminal and comprising codes for executing procedures by the above portable terminal is recorded.

According to the present disclosure, when an attempt to steal a value from someone else's transportable device is made on a portable terminal for an operator to present to a payer of an electronic value, attempted stealing can easily be revealed and thus wrongful use can be suppressed.

BRIEF DESCRIPTION OF THE DRAWINGS

FIG. 12 is a flowchart of the authentication/payment process on the portable terminal according to Embodiment 2.

DETAILED DESCRIPTION

Figure 1:
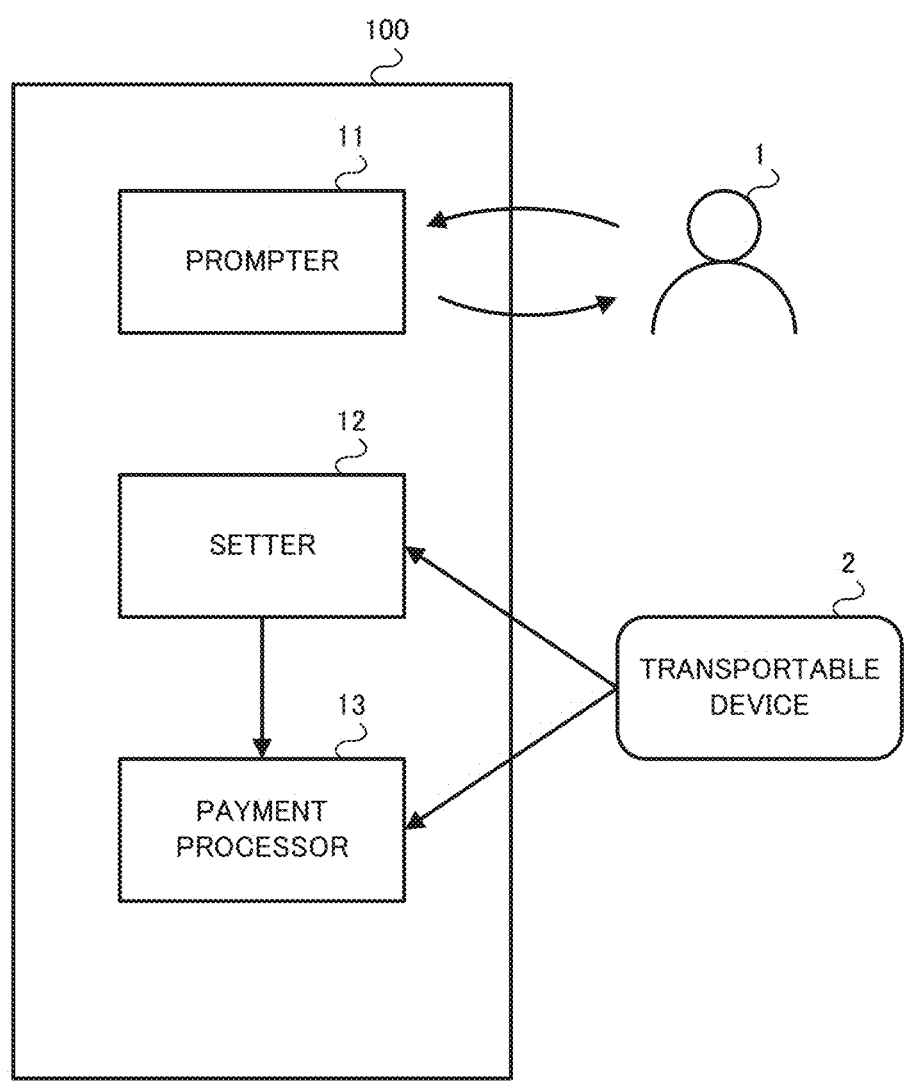
FIG. 1 is a block diagram showing the functional configuration of the portable terminal according to Embodiment 1.

Embodiments of the present disclosure will be described below with reference to the attached drawings.

Embodiment 1

An electronic value in an electronic money system has value similar to cash. An electronic value may be managed in the same monetary unit as cash so as to be exchanged mutually or from one to the other, or may be converted using a unique unit upon exchange. Moreover, various kinds of points given to the user according to his action (purchasing a product, answering a questionnaire, visiting a store, and the like) can be used as an electronic value.

This embodiment is applicable to an electronic money system called a stored-value type. In a stored-value type system, an electronic value available for the user to make payments for prices in transactions (also called "the balance") is managed in association with various kinds of transportable devices such as cards in which an electronic circuit is incorporated, cellphones, and smartphones.

In a stored-value type system, generally, the numerical value of an available electronic value is stored in an electronic circuit possessed by a transportable device. This mode corresponds to a wallet with cash therein. Comparing to "cash remaining in a wallet," a value associated with a transportable device is called a "remaining value" hereafter.

The provider of a product or a service receives a payment for the price from the user by using a reader/writer communicable with a transportable device. As the user places a transportable device over the reader/writer, the transportable device and the reader/writer become communicable. The reader/writer transmits various kinds of commands to the transportable device and execution results of the commands are transmitted from the transportable device to the reader/writer.

For example, using an inquiry command, as an execution result, the numerical value of a remaining value currently associated with the transportable device can be acquired.

A decrease command decreases the remaining value associated with the transportable device by an electronic value specified by this command. This corresponds to taking out cash from a wallet. In other words, a decrease command is used to pay a price in a transaction to receive a product or a service, namely to "bill." Hereafter, an electronic value specified by a decrease command is called a "price value."

An increase command increases the remaining value associated with the transportable device by an electronic value specified by this command. This corresponds to putting cash in a wallet. An increase command is used to charge the transportable device with an electronic value corresponding to cash, for example, in a store instead of the user paying in cash to the sales assistant.

Here, when the transportable device has the function of communication via a computer communication network such as the Internet, an application running on the transportable device may acquire or increase/decrease the remaining value associated with the transportable device in response to a command sent via the computer communication network. In such a case, it is possible to pay a price or charge the remaining value without using a reader/writer.

Increasing/decreasing the electronic value with a decrease command or an increase command means that a value shifts between the payer and the provider. The provider informs the electronic money management server of information of the value shift. The electronic money management server is administered by an administrator of the entire electronic money service. The total electronic value the provider obtained or lost during a specific period can be obtained by gathering payment information accumulated on the electronic money management server.

If the provider gains some electronic value, the provider can exchange and obtain cash from the administrator. On the other hand, if the provider loses some electronic value, the provider owes the administrator payment of cash or the like for the electronic value.

Here, an intermediary party may be present between the provider and the administrator of the entire electronic money service. This party is called a business operator of the electronic money service and gives advice and/or support on preparation of infrastructures necessary for the provider to receive payments of electronic values and/or handling of electronic values. In this embodiment, a portable terminal such as a cellphone and a smartphone prepared by the provider is used as a reader/writer for receiving payments of electronic values. However, a program for making the portable terminal function as a reader/writer is distributed to the portable terminal by a distribution server prepared by the administrator or the business operator.

In this embodiment, NFC is used for communication between a portable terminal functioning as a reader/writer and a transportable device present within its communicable range. However, infrared communication or Bluetooth (registered trademark) may be used.

Here, this embodiment is applicable to an electronic money system called the server value method. In the server value method, identification information of an account corresponding to a wallet of an electronic value is acquired from the transportable device, and the account and the remaining value in the account are managed on the server of the administrator or the business operator. In other words, in the server value method, the transportable device functions as an identification tag for identifying the account but does not store the remaining value itself.

In this embodiment, the so-called thin client method is assumed. In the thin client method, the portable terminal functions as a reader/writer and a user interface for exchanging various kinds of information with humans, and transmission/reception of commands to/from a transportable device is controlled by a thin client server. The thin client server may be prepared by the provider himself or one licensed to the provider by the business operator. The thin client server also plays the role of a treasurer of the electronic value for the provider. Management information is exchanged between the thin client server and the administrator periodically, typically once a day, to obtain the total electronic value possessed by the provider.

However, this embodiment is also applicable to the so-called rich client method. In the thin client method, the portable terminal relays communication between a transportable device and the server and is in charge of interaction with the user. However, in the rich client method, the portable terminal further plays the role of the server. In other words, the portable terminal examines transmission/reception of commands to/from a transportable device and is in charge of periodic communication with the administrator.

The portable terminal of this embodiment can be a piece of hardware such as a smartphone and a cellphone, can be configured by a dedicated electronic circuit, or can be realized by a computer executing a program. Additionally, as an intermediate form between a computer and a dedicated electronic circuit, the portable terminal of this embodiment can be configured by applying techniques such as the field programmable gate array (FPGA) in which a program is compiled into an electronic circuit design script and an electronic circuit is dynamically configured based on the design script.

The portable terminal of this embodiment provides a technique for suppressing wrongful acts of the portable terminal user (including one who stole the portable terminal from the provider in addition to the provider and employees of the provider). The technique will be outlined below.

Using a portable terminal capable of processing a payment with a transportable device, a user who is not the provider of a product or a service can process a payment on his own portable terminal. For example, when a user playing a social game or the like on his portable terminal has to make a payment within the game for using a fee-based content or purchasing a fee-based item, the user can make a payment with a transportable device using his own portable terminal. Besides, in online shopping via a portable terminal, it is possible to make a payment with a transportable device using the portable terminal owned by the user as a new payment method in place of credit payment using a credit card, bank transfer, or payment on delivery. In such a payment with a transportable device owned by the user using a portable terminal owned by the user, the combination of the same portable terminal and transportable device is often used.

On the other hand, there is a risk for wrongful use such as stealing an electronic value from someone else's transportable device by bringing someone else's transportable device closer and processing a payment using such a portable terminal capable of processing a payment. With such wrongful use, except for the case in which the transportable device itself is stolen and successively used for payments, a payment is made with a transportable device that has almost no history of payment on that portable terminal in many cases. In other words, a transportable device frequently and repeatedly used by the user is highly likely to be owned by the user himself compared to a transportable device that is not so.

In this embodiment, a concept of "rarity" is introduced as an indicator indicating the degree of rareness of a case of being used for payment on the target terminal hardware up to then. The rarity is low when a target transportable device is frequently used for payment on the target terminal hardware up to then. Conversely, the rarity is high when a target transportable device is less frequently or never used for payment on the target terminal hardware up to then.

The technique provided by the portable terminal of this embodiment is intended to, upon payment of an electronic value, identify a transportable device used for payment and request a different action of the user based on the frequency (rarity) of payment with the transportable device on the terminal device. Particularly, when an attempt to use a transportable device used for payment on the portable terminal less frequently (at a high rarity) is made, the user is required different handling from when a transportable device with a high frequency (a low rarity) is used for payment (particularly, handling noticeable to people around). This is intended to suppress wrongful use by the user or make the owner of the transportable device or people around easily notice the wrongful use.

The portable terminal of this embodiment sets a holding time based on the rarity of the transportable device on the terminal and executes the payment procedure on the condition that the transportable device and the portable terminal are kept in the short range communication-enabled state for the set holding time. The portable terminal sets a relatively long holding time for a transportable device with a high rarity and sets a relatively short holding time for a transportable device with a low rarity. Therefore, the user can process a payment in a short holding time when using a transportable device frequently used for payment in the past. On the other hand, for using a transportable device less frequently used for payment in the past, the user has to keep the short range communication-enabled state for a relatively long time for processing a payment. Therefore, for example, when an attempt to steal a value from someone else's transportable device is made, the someone else's transportable device has to be held near the portable terminal for a long time and the stealing is likely to be noticeable to people around. As a result, it is possible to discourage the user of the portable terminal from stealing, or easily make the user of the transportable device and/or people around notice the stealing if the stealing actually occurs.

FIG. 1 is an explanatory illustration outlining the portable terminal according to an embodiment of the present disclosure. The following explanation will be made with reference to this figure.

A portable terminal 100 according to this embodiment is realized by downloading a program distributed from a distribution server by the business operator or the administrator of an electronic money system to terminal hardware such as a smartphone and a cellphone.

Generally, the program executed on the terminal hardware can be recorded on a non-transitory computer-readable information recording medium such as a compact disc, a flexible disk, a hard disc, a magneto-optical disk, a digital disc, a magnetic tape, a read only memory (ROM), an electrically erasable programmable ROM (EEPROM), a flash memory, and a semiconductor memory. The information recording medium can be distributed/sold independently from the terminal hardware.

On the terminal hardware, a program recorded on a non-transitory information recording medium such as a flash memory is read onto a random access memory (RAM) that a temporary storage and the central processing unit (CPU) executes instructions included in the read program. However, with an architecture enabling mapping of the ROM and the RAM in a single memory space for execution, instructions included in a program saved in the ROM are directly read and executed by the CPU.

Furthermore, the above program can be distributed/sold from a non-transitory storage device such as a distribution server managed by the business operator to terminal hardware or the like via a transitory transfer medium such as a computer communication network independently from a computer on which the program is executed.

The portable terminal 100 according to this embodiment comprises a prompter 11, a setter 12, and a payment processor 13. Operation of each part will be outlined below.

When a user 1 conducts an operation to process a payment using the portable terminal 100 (as the user 1 makes application for purchase), the prompter 11 has the function of prompting the user 1 to enable the near field communication between a transportable device 2 and its own terminal. Particularly, the portable terminal 100 comprises hardware for conveying a message to the user 1 such as a screen as described later. Using such hardware, the prompter 11 conveys various kinds of messages to the user 1 in addition to the above message.

As the user 1 places the transportable device 2 near the portable terminal 100 to enable the near field communication between the transportable device 2 and the portable terminal 100, the setter 12 acquires identification information of the transportable device 2 via the near field communication. Then, the setter 12 calculates the rarity of the transportable device 2 on the portable terminal 100 with reference to history data. Then, the setter 12 sets a time for which the user 1 should keep the near field communication-enabled state between the transportable device 2 and the portable terminal 100 (a holding time) based on the calculated rarity.

As the near field communication-enabled state between the transportable device 2 and the portable terminal 100 continues for the presented holding time or longer since the holding time is presented to the user 1, the payment processor 13 receives a payment of an electronic value from an account associated with the transportable device 2 via the near field communication.

Comprising the above functioning parts, the portable terminal 100 achieves the objective of the present disclosure of this application. The above functioning parts (the prompter 11, the setter 12, and the payment processor 13) are realized by the CPU executing instructions included in a program saved in the ROM or the RAM of the terminal hardware as described above.

Figure 2:
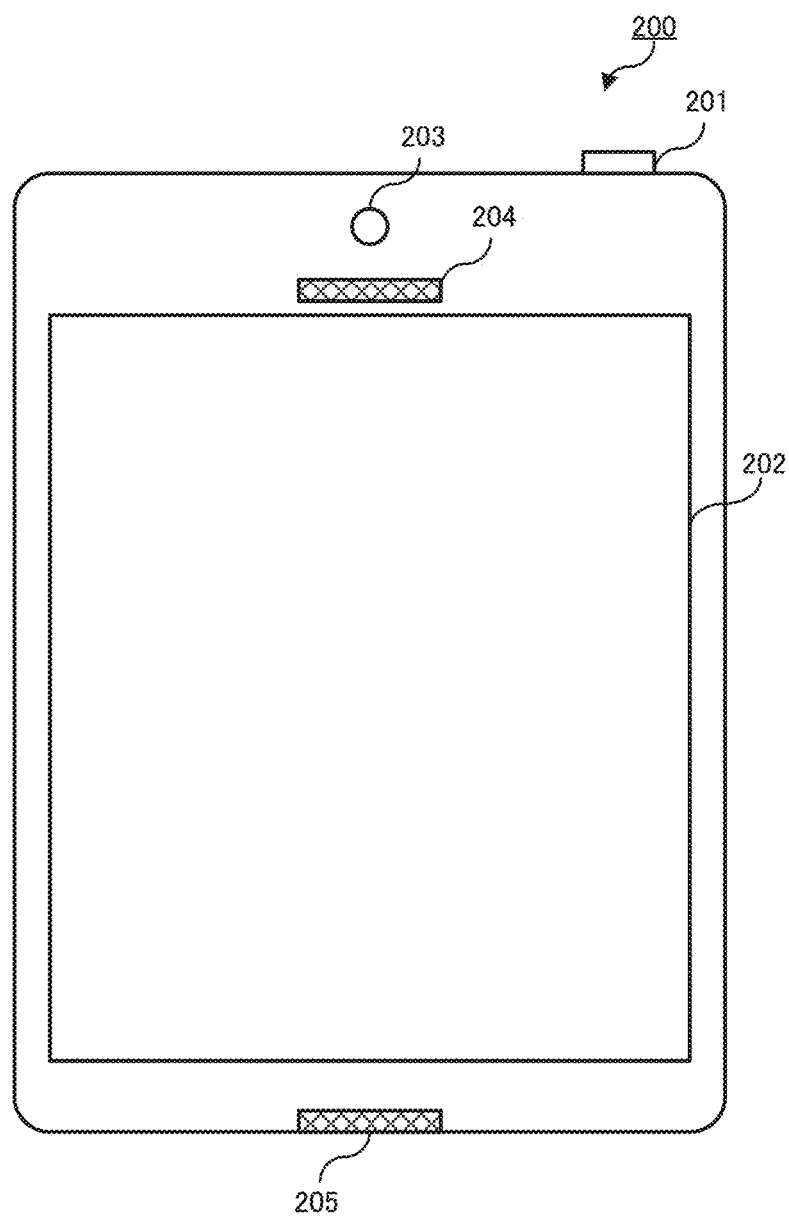
FIG. 2 is an explanatory illustration for showing the appearance of the front of the terminal hardware.

On the front of terminal hardware 200 of the portable terminal 100, as shown in FIG. 2, a touch screen 202 is prepared and additionally a button 201 for operating the terminal hardware, a front camera 203 for capturing an image or a video, and a speaker 204 and a microphone 205 for telephone calls and sound input/output are disposed. Comprising these devices, the terminal hardware 200 has the functions mounted that are provided by a conventional smartphone such as displaying messages to the user by means of the touch screen 202 and receiving operations from the user via the button 201 and/or the touch screen 202.

Figure 3:
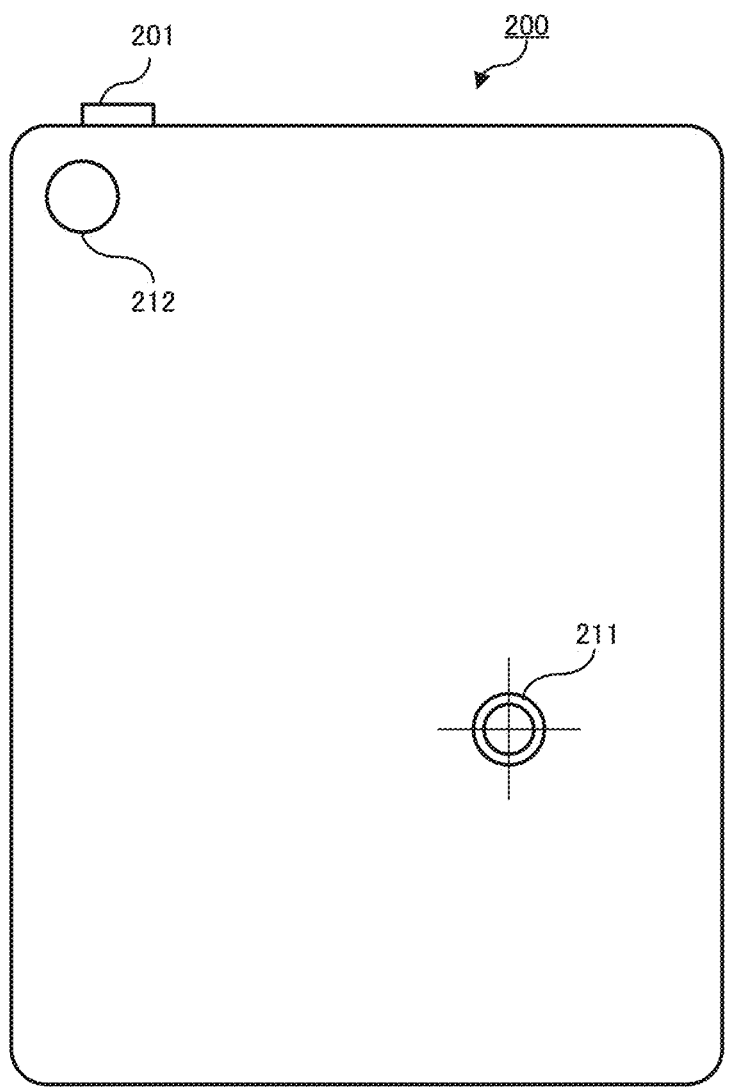
FIG. 3 is an explanatory illustration for showing the appearance of the back of the terminal hardware.

On the back of the terminal hardware 200, as shown in FIG. 3, a back camera 212 and a marker 211 indicating the position where an NFC chip is disposed are attached. As the user places a transportable device to overlap with the marker 211, the NFC chip detects the transportable device and the payment procedure is made executable.

The terminal hardware 200 communicates with the transportable device through near field communication by the NFC chip as described above. During the communication, as long as the NFC chip and the transportable device are sufficiently close to each other, the NFC chip and the transportable device can communicate even if they are not in contact or there is some obstacle between them. Therefore, if a transportable device is carried always near the NFC chip of the terminal hardware 200 including times when payments are necessary, the user can easily process a payment without necessity of placing the transportable device near the NFC chip only after a payment becomes necessary. Therefore, it is presumable to provide a case protecting the exterior of the terminal hardware with a pocket to house a transportable device near the position corresponding to the marker 211 and house the transportable device in the pocket.

As described above, the portable terminal according to this embodiment executes the processing based on the rarity of a transportable device. The rarity can be calculated in various modes. For example, the rarity may be calculated from the number of payments made with the transportable device in a given immediately preceding period (six months or one year) (in such a case, the rarity is the highest if there is no record of payment in the period). Alternatively, the rarity may be a numerical indicator indicating the period to the present from the last payment made with the transportable device on the target terminal hardware (in such a case, the rarity is the highest if there is no record of past payment made with the transportable device). Additionally, the rarity may be the ratio of payments made with the target transportable device to payments processed on the target terminal hardware within a given immediately preceding period. Alternatively, in a more simplified mode, it may be determined that "the rarity is low" when there is history of payments made with the target transportable device on the target terminal hardware in a particular period (in the last one year) and that "the rarity is high" when there is no such history.

Moreover, the rarity can be expressed in many ways. As an example, the rarity may be expressed by to which of two groups the target transportable device belongs, "the rarity is high" or "the rarity is low," or alternatively by to which of a larger number, three or more, of groups the target transportable device belongs. Moreover, the rarity may be expressed by a numerical indicator and, for example, may be a numerical indicator indicating the period to the present from a payment made with the transportable device. The following explanation will be made in regard to a portable terminal determining that the rarity is "high" when there is history of use of the transportable device on the portable terminal within a given immediately preceding period (one year) and otherwise determining that the rarity is "low" by way of example.

Figure 4:
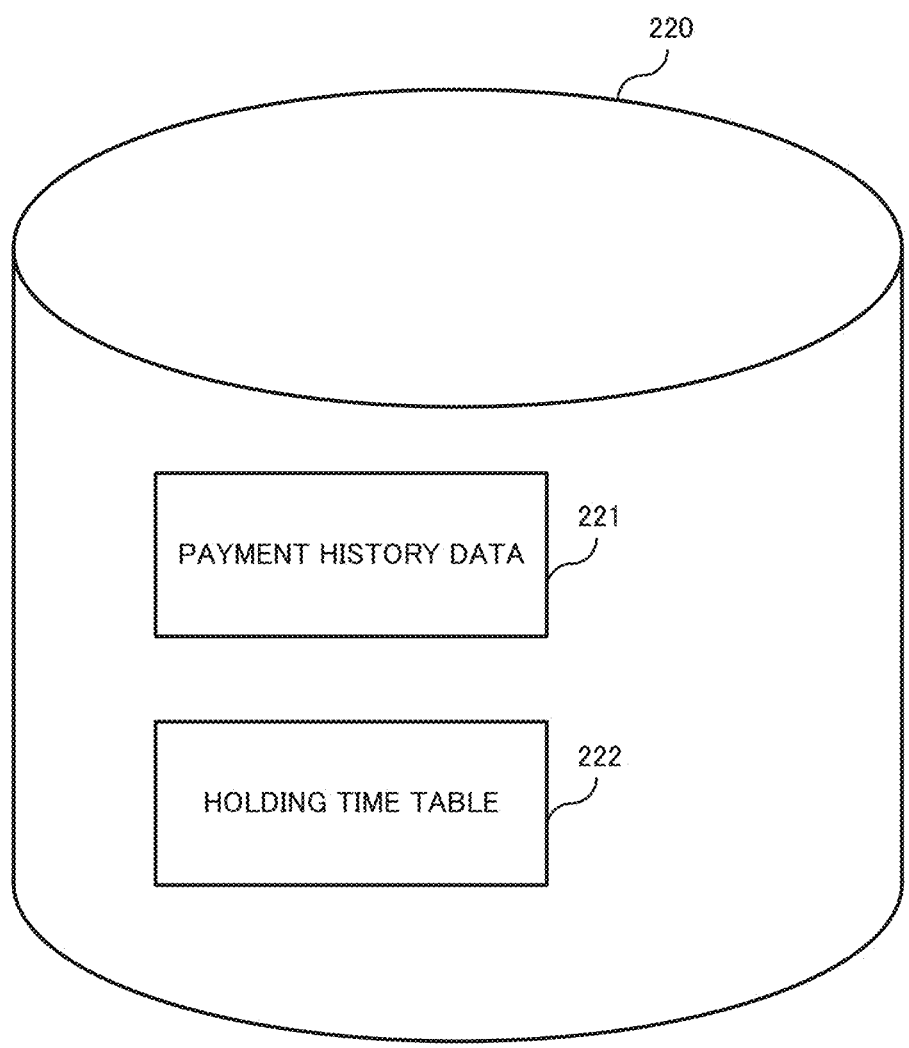
FIG. 4 is an illustration showing data the portable terminal retains in the recorder.

The terminal hardware 200 has a recorder 220 therein and makes reference to data under the control of a program or records new data. The recorder 220 comprises, as shown in FIG. 4, a region to record payment history data 221 and a region to record a holding time table 222.

The payment history data 221 are data created by the terminal hardware 200 associating and recording the dates and times of payments made with a transportable device up to then and identification information of the transportable device used for the payments. As a payment is made with a transportable device on its own terminal, the terminal hardware 200 associates and records in the recorder 220 information indicating the date and time at the time and identification information of the transportable device as payment history data 221. Additionally, the purpose of the payment made and the paid amount may also be recorded.

The holding time table 222 is data including information indicating the rarity of a transportable device and information indicating a holding time associated with it. In this embodiment, the holding time table 222 associating information indicating that "the rarity is low (high frequency)" with a holding time "five seconds" and information indicating that "the rarity is high (low frequency)" with a holding time "30 seconds" is recorded in the recorder 220.

Needless to say, as described above, the mode of classifying the rarity is not restricted to one indicating to which of the two groups the rarity belongs, "the rarity is high" or "the rarity is low." Therefore, in the holding time table 222, for example, the rarity (the number of payments made with the transportable device in the last one year) may be classified into three or more groups such as "one or less," "one to three," "four or more," and the like. In such a case, the terminal hardware 200 records in the holding time table 222 a holding time associated with each of the groups. Furthermore, data indicating the holding times recorded in the holding time table 222 do not need to be constants. Particularly, when the rarity indicates a numerical indicator, not to which of multiple groups the rarity belongs, a condition including a mathematical expression to derive a holding time from a numerical value recorded as the rarity may be recorded in the holding time table 222. As an example, when a numerical indicator indicating the number of days from the last payment made with the transportable device to the present is set as the rarity, data indicating a condition "Holding time=a constant (for example, 0.1 second/day)× the rarity (for example, 120 days) given that the maximum holding time is 30 seconds" may be recorded in the holding time table 222.

Each time a payment is processed, the portable terminal 100 adds data indicating the content of the processed payment to the payment history data 221. Therefore, as payments are repeatedly processed, the payment history data 221 are gradually expanded in the recorder 220. The payment history data 221 can be handled by any way and the portable terminal 100 may keep accumulating the payment history data 221 as they are. Alternatively, the portable terminal 100 may periodically move to another device or delete data included in the payment history data 221 and regarding the payments since the processing of which a given or longer time has elapsed, thereby protecting the payment history data 221 from becoming larger in size than necessary.

The holding time table 222 may be set before shipping of the terminal hardware 200 or may be periodically updated via the distribution server.

Figure 5:
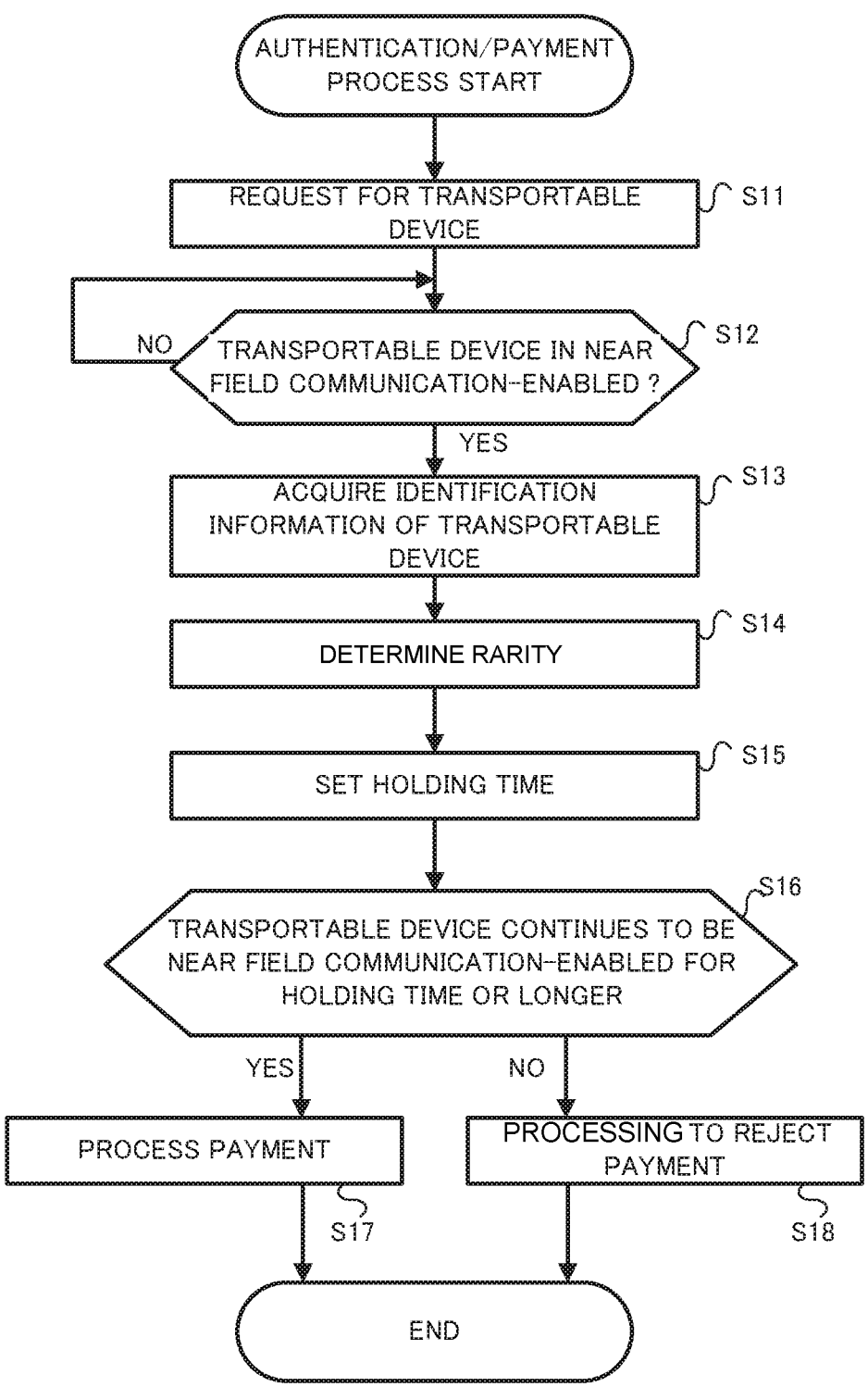
FIG. 5 is a flowchart of the authentication/payment process on the portable terminal according to Embodiment 1.

FIG. 5 is a flowchart showing the process flow executed by the portable terminal according to the embodiment of the present disclosure. The following explanation will be made with reference to this figure. As described above, this procedure starts by executing a program on the terminal hardware and this procedure realizes the portable terminal 100.

As an operation to process a payment is conducted by the user, the portable terminal 100 starts the authentication/payment process shown in FIG. 5.

Figure 6:
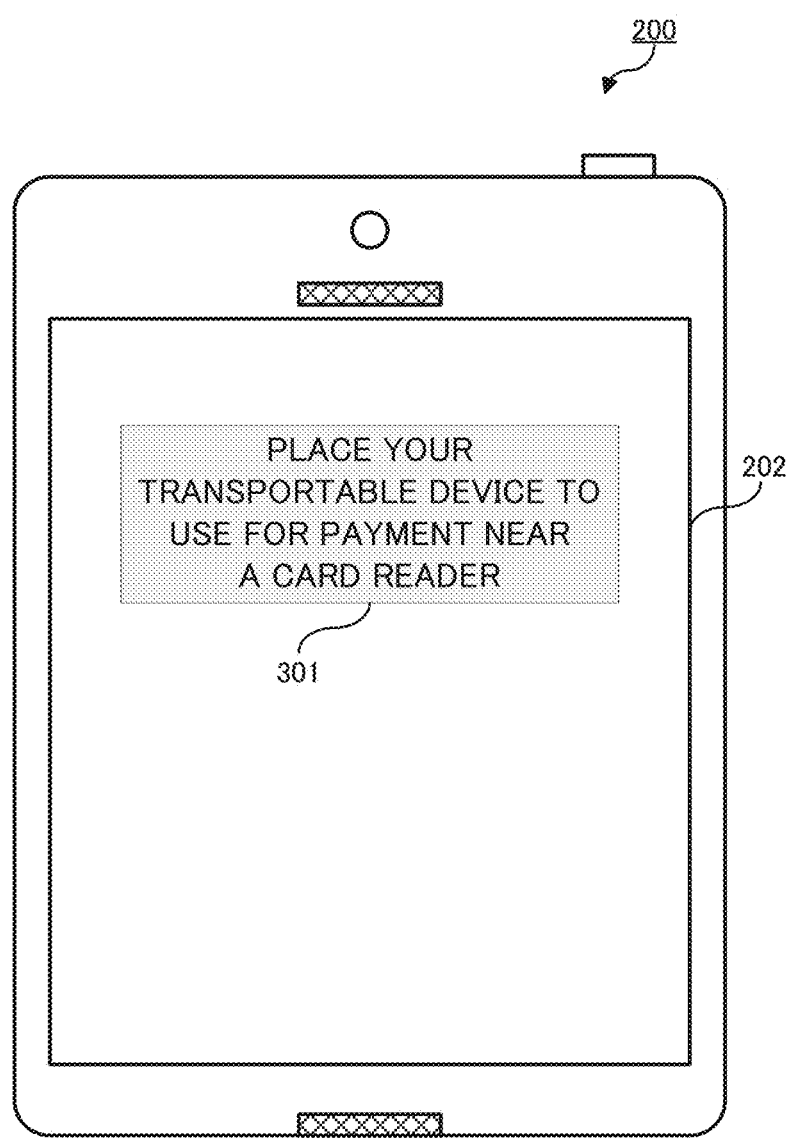
FIG. 6 is an illustration showing a screen when the terminal hardware displays a message requesting the user to enable the near field communication.

At the beginning of the authentication/payment process, the portable terminal 100 requests the user to place a transportable device near the NFC chip to enable the near field communication (Step S11). In this processing, for example, the portable terminal 100 displays, as shown in FIG. 6, a massage 301 requesting the user to place a transportable device near the NFC chip (a card reader) on the touch screen 202 of the terminal hardware 200. Alternatively, for example, a message of the same content may be output as sound from the speaker 204.

Then, the portable terminal 100 waits until a transportable device is made near field communication-enabled by the user (Step S12). In this embodiment, the portable terminal 100 executes no other processing until the near field communication is enabled (Step S12: NO). However, for example, if the near field communication is not enabled within a given time period, the portable terminal 100 may end the authentication/payment process as exception processing.

Figure 7:
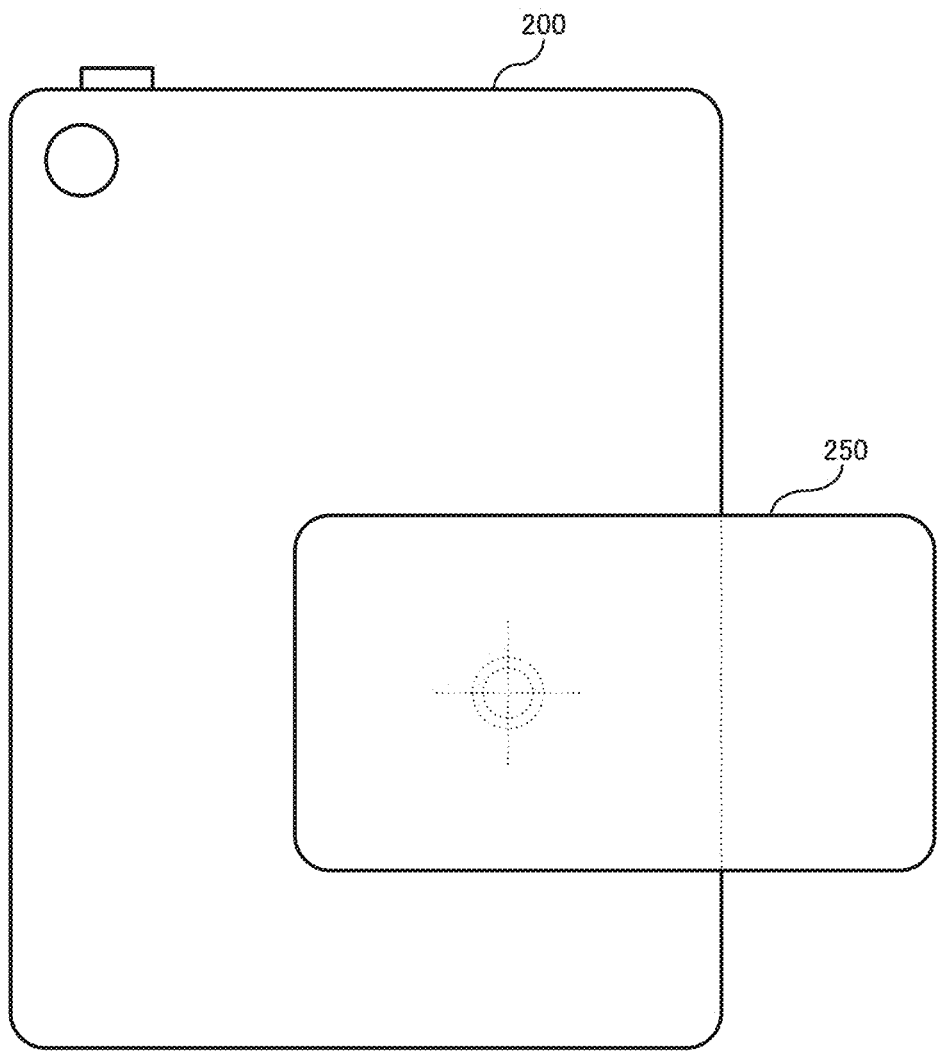
FIG. 7 is an illustration showing the transportable device placed near the portable terminal.

If the portable terminal 100 and the transportable device become near field communication-enabled in the Step S12, the portable terminal 100 shifts the processing to the next step. The portable terminal 100 and the transportable device becoming near field communication-enabled means that, as shown in FIG. 7 by way of example, as the user brings a transportable device 250 closer to overlap with the marker 211 on the back of the terminal hardware 200, the NFC chip detects the presence of the transportable device 250 and the two become communicable.

Then, the portable terminal 100 acquires identification information from the transportable device using the enabled near field communication (Step S13).

Subsequently, the portable terminal 100 determines the rarity based on the identification information acquired from the transportable device (Step S14). Specifically, the portable terminal 100 determines, with reference to the payment history data 221, whether there is payment history in which the same identification information as the identification information acquired from the transportable device is recorded among payments processed within a given period (within the past one year from the present). Consequently, if there is applicable history, it is determined that "the rarity is low" with regard to the transportable device. Conversely, if there is no applicable history, the portable terminal 100 determines that "the rarity is high" with regard to the transportable device. However, the rarity can be calculated and classified by any mode as described above and any calculation and determination method may be used.

Subsequently, the portable terminal 100 sets a holding time based on the determined rarity (Step S15). Specifically, the portable terminal 100 reads a holding time associated with the rarity determined in the Step S14 from the holding time table 222 based on the rarity. For example, if determined in the Step S14 that "the rarity is high," the portable terminal 100 reads and sets as the holding time a holding time associated with the case of the rarity being high (for example, 30 seconds). Similarly, if determined that "the rarity is low," the portable terminal 100 sets as the holding time a holding time associated with the case of the rarity being low (for example, five seconds).

Then, the portable terminal 100 determines whether the state of the near field communication with the transportable device being enabled continues for the holding time read in the Step S15 or longer (Step S16). Specifically, the portable terminal 100 monitors whether the time elapsed since the near field communication is enabled is equal to or longer than the holding time set in the Step S15. If continuing for the holding time or longer, the portable terminal 100 determines that the near field communication-enabled state has "continued" (Step S16: YES). On the other hand, if the near field communication-enabled state ends before continuing for the holding time or longer, the portable terminal 100 determines that the near field communication-enabled state has "not continued" (Step S16: NO).

If determined in the Step S16 that the state of the near field communication with the transportable device being enabled continues for the holding time or longer (Step S16: YES), the portable terminal 100 executes the processing of payment with the transportable device (Step S17). Specifically, the portable terminal 100 receives a payment of an electronic value from the account associated with the transportable device and displays on the screen the reception of the payment. After finishing the Step S17, the portable terminal 100 ends the authentication/payment process.

On the other hand, if determined in the Step S16 that the state of the near field communication with the transportable device being enabled does not continue for the holding time or longer (Step S16: NO), the portable terminal 100 executes the processing to reject the payment with the transportable device (Step S18). Specifically, the portable terminal 100 displays a message of rejection of the payment on the touch screen 202 and outputs a notification sound or the like from the speaker 204 as well. After executing the Step S18, the portable terminal 100 ends the authentication/payment process.

The portable terminal 100 executes the processing of payment with the transportable device through the authentication/payment process described above. With this process, the portable terminal 100 requests a relatively long holding time of the user in processing a payment with a transportable device with a high rarity and on the other hand, enables payment with a relatively short holding time in processing a payment with a transportable device with a low rarity. Therefore, when a transportable device frequently used in processing payments in the past is used (highly probably belonging to the user himself), the payment is processed in a short time and it is convenient to the user. On the other hand, for a transportable device less frequently used in processing payments in the past, the portable terminal 100 requests the user to place the transportable device near its own terminal for a long time, whereby if the transportable device is somebody else's, attempted payment is more easily revealed. As a result, it is possible to suppress wrongful use of a transportable device.

Figure 8:
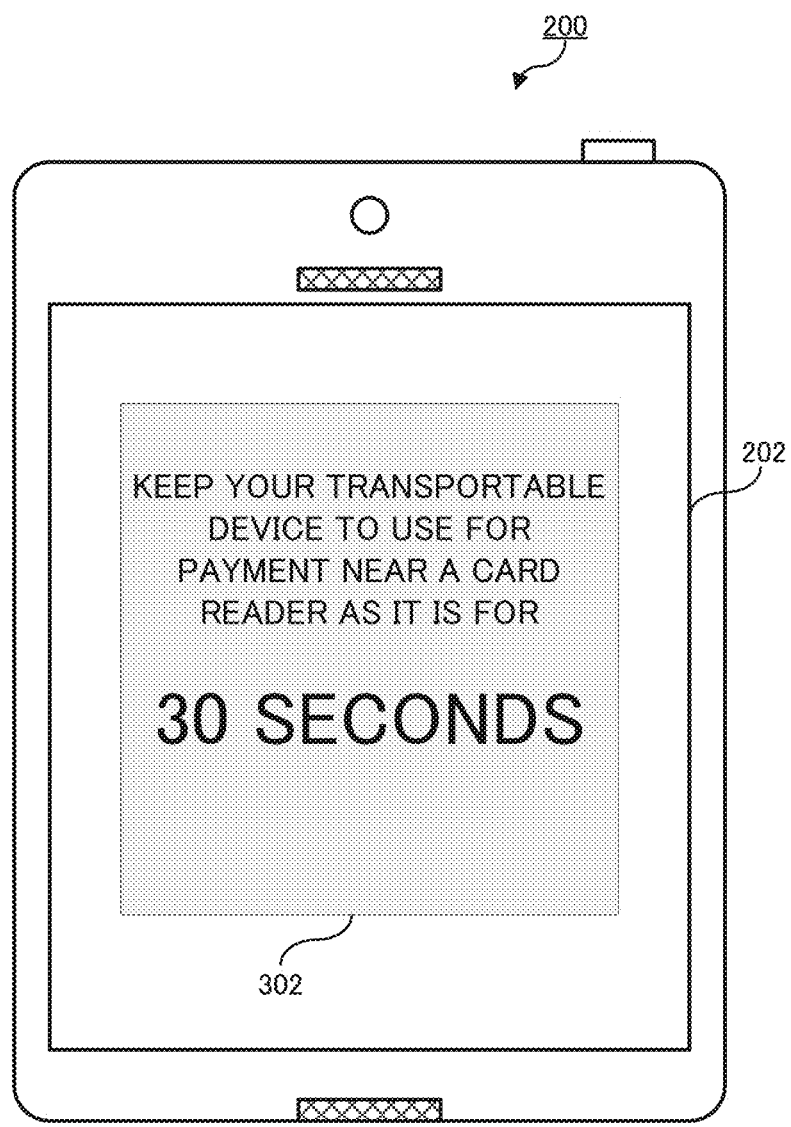
FIG. 8 is an illustration showing a screen for requesting the user to keep the near field communication-enabled state for a holding time.

The above-described contents include no description regarding the portable terminal 100 presenting a set holding time to the user until a payment is processed since the near field communication with the transportable device is enabled. However, the portable terminal 100 may present the holding time to the user. Specifically, after setting a holding time in the Step S15 of the above-described authentication/payment process, as shown in FIG. 8, a massage 302 showing the set holding time may be displayed on the touch screen 202. As a result, the user can know how long he should keep the transportable device in the state of the near field communication with the portable terminal 100 being enabled. As a result, particularly when a long holding time is set, it is possible to prevent the user from mistakenly assuming that an error occurs and pulling the transportable device back from the portable terminal 100.

Moreover, assuming that a payment attempted on a portable terminal is, for example, for subscription of a game on the portable terminal, when an operation to start the processing of payment for the subscription (an operation to start the authentication/payment process) is conducted, it may be possible to allow execution of the game even before the payment processing is completed while the authentication/payment process is executed. In this way, in the case of purchasing the game subscription for the next term immediately before the subscription expires, the user can continue to play the game without a break for the time required for the purchase processing. Therefore, it is possible to prevent the consumer from losing his interest in the game due to a break in playing the game.

Modified Embodiment 1

In the above-described Embodiment 1, the portable terminal requests the user to keep the transportable device in the near field communication-enabled state for a longer time when a transportable device less frequently used is used than when a transportable device frequently used is used. However, an action requested by the portable terminal for authentication on payment in the present disclosure is not restricted to "keeping in the near field communication-enabled state for a long time." Hereafter, a case in which when a transportable device less frequently used is used, the portable terminal presents a "required action" to the user and processes the payment if the action is executed within a set holding time will be described as Modified Embodiment 1.

In Modified Embodiment 1, the required action means an action the portable terminal requests the user to execute prior to the payment processing. Examples of the required action include the user shaking the portable terminal while keeping a transportable device and the portable terminal in the near field communication-enabled state and the like.

In Modified Embodiment 1 described below, the portable terminal comprises a vibration sensor (a vibration detector) for detecting vibration applied to its own terminal. The portable terminal requests the user to shake its own terminal as a "required action" and if the vibration detector detects vibration, detects the "required action" being taken. However, as described later, the vibration detector is not an essential component; it's an arbitrary component.

Figure 9:
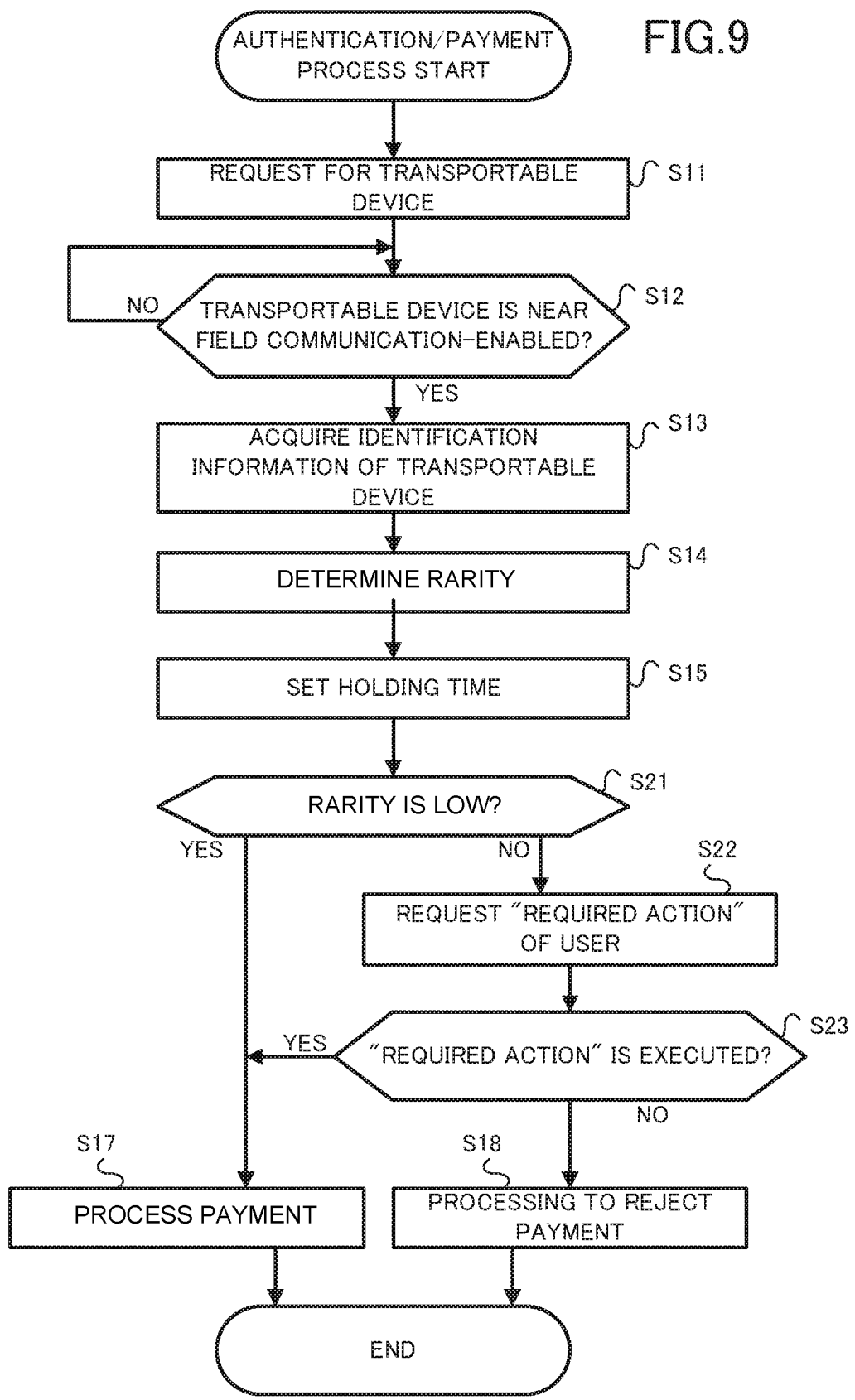
FIG. 9 is a flowchart of the authentication/payment process on the portable terminal according to Modified Embodiment 1.

The portable terminal according to Modified Embodiment 1 executes authentication and payment processing by the authentication/payment process shown in FIG. 9. The following explanation will be made with reference to FIG. 9. Here, the processing up to the setting of a holding time in the Step S15 since an operation to process a payment is conducted on the portable terminal and the authentication/payment process starts is the same as in Embodiment 1 and therefore the explanation of those steps is omitted.

After setting a holding time in the Step S15, the portable terminal determines whether the rarity determined in the Step S14 is low (Step S21). This is for not requesting a "required action" on the assumption that the transportable device is highly likely to belong to the user himself if the rarity is low, and conversely, for requesting a "required action" if the rarity is high. In the case of the rarity being classified into two groups, it is determined that the rarity is low if the determined rarity belongs to the low group and otherwise it is determined that the rarity is high. Moreover, in the case of the rarity being classified into three or more groups, each group is associated with whether to fall under a low-rarity group. Alternatively, when the rarity is expressed by a numerical indicator, the portable terminal determines that the rarity is low if the determined rarity is lower than a threshold and otherwise determines that the rarity is high.

If determined in the Step S21 that the rarity is low (Step S21: YES), the portable terminal processes the payment (Step S17). Operation in the Step S17 is the same as in Embodiment 1 and its explanation is omitted.

Figure 10:
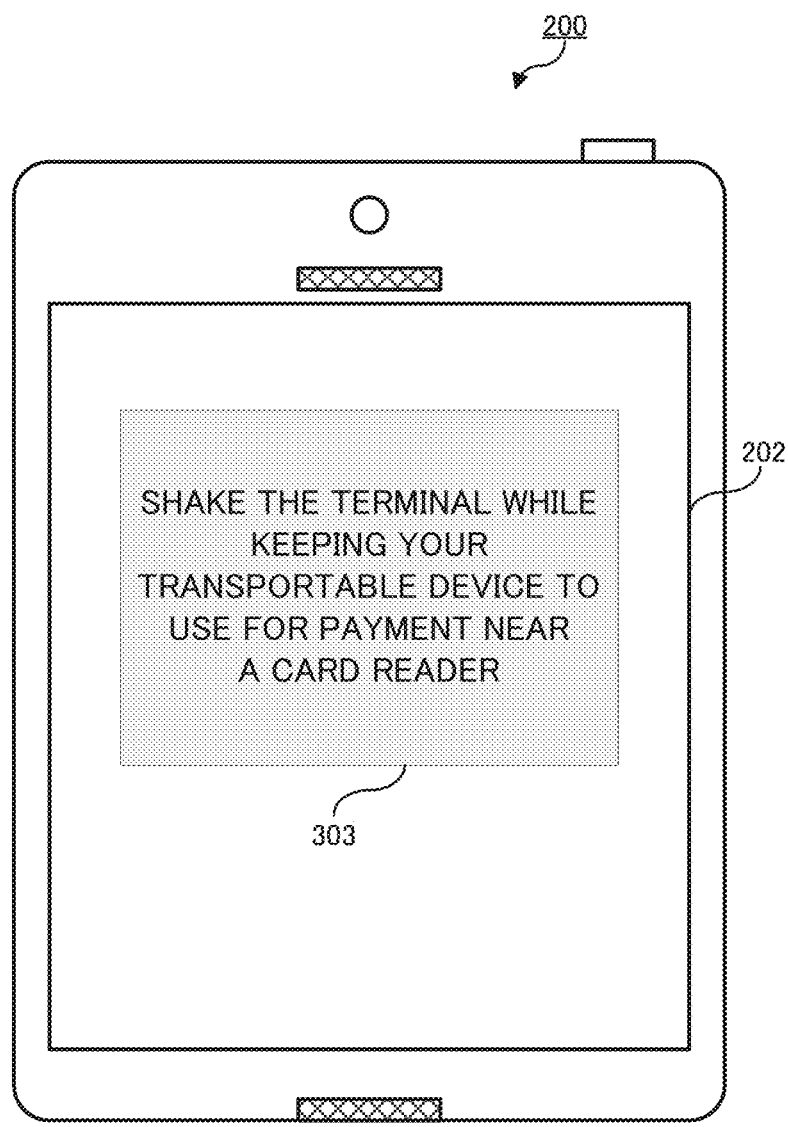
FIG. 10 is an illustration showing an exemplary screen on which the portable terminal according to Modified Embodiment 1 displays a message requesting a required action of the user.

If determined in the Step S21 that the rarity is high (Step S21: NO), the portable terminal presents a "required action" to the user (Step S22). The portable terminal reads a "required action" recorded in the recorder 220 and displays the "required action" on the touch screen 202 as a message 303 as shown in FIG. 10. In the example shown in FIG. 10, the portable terminal requests the user to shake the portable terminal while keeping the transportable device and the portable terminal in the near field communication-enabled state.

Subsequent to the Step S22, the portable terminal determines whether the presented "required action" is executed (Step S23). The portable terminal waits until a holding time elapses since the "required action" is presented, and monitors whether the presented action (shaking the portable terminal or the like) is executed within that period.

If determined in the Step S23 that the "required action" is executed (Step S23: YES), the portable terminal processes the payment (Step S17). Operation in the Step S17 is the same as in Embodiment 1 and its explanation is omitted.

On the other hand, if determined in the Step S23 that the "required action" is not executed (Step S23: NO), the portable terminal executes the processing to reject the payment (Step S18). Operation in the Step S18 is also the same as in Embodiment 1 and its explanation is omitted.

After processing the payment in the Step S17 and after performing the processing to reject the payment in the Step S18, the portable terminal ends the authentication/payment process.

In Modified Embodiment 1, the portable terminal can request the user, as authentication action prior to payment, not only to keep the near field communication-enabled state for a set holding time but also to execute an action more noticeable to people around. Therefore, as in Embodiment 1, it is possible to suppress wrongful use of a transportable device.

Figure 11:
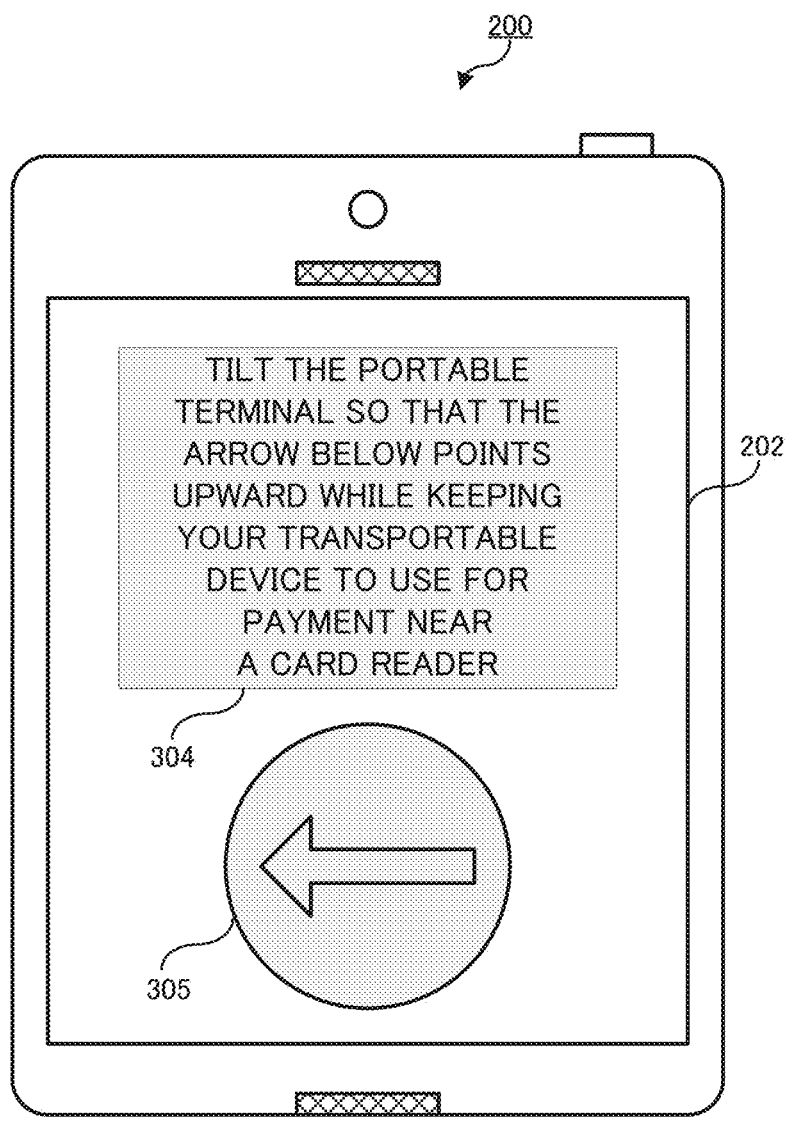
FIG. 11 is an illustration showing an exemplary screen on which the portable terminal according to Modified Embodiment 1 displays a message requesting a required action of the user.

In Modified Embodiment 1, the "required action" the portable terminal requests of the user is not restricted to shaking the portable terminal while keeping the transportable device and the portable terminal in the near field communication-enabled state. For example, when the portable terminal comprises a tilt sensor detecting the tilt of its own terminal, the portable terminal may request the user to tilt its own terminal to a given angle while keeping its own terminal and the transportable device in the near field communication-enabled state. In such a case, as shown in FIG. 11, the portable terminal presents to the user a message 305 showing the user an arrow and meanwhile displays a message 304 requesting turning the arrow shown by the message 305 into a given direction (for example, upright). Then, the portable terminal detects the tilt angle of its own terminal by means of the tilt sensor and detects the "required action" being performed if the tilt angle is equal to an angle the user is requested for.

Alternatively, the portable terminal may request the user to repeatedly move the transportable device and its own terminal closer to and away from each other a given number of times as the "required action." When the "required action" is to repeatedly move the transportable device and its own terminal closer to and away from each other a given number of times, since the mechanism for near field communication provides an arrangement to detect the "required action," a portable terminal without a mechanism such as a vibration sensor or a tilt sensor can realize the arrangement in Modified Embodiment 1. Besides, the "required action" can be any action detectable by the portable terminal itself. Moreover, the portable terminal may perform multiple actions simultaneously or sequentially for the user.

Moreover, the portable terminal according to Modified Embodiment 1 may store multiple "required actions" and present a "required action" randomly selected from among those when processing a payment. In this way, the user cannot know the required action in advance. When attempting wrongful use of someone else's transportable device, the user cannot know the "required action" in advance and has to see the "required action" presented for the first time after placing the transportable device near the portable terminal and perform the action. Therefore, it is more difficult for the user to execute the "required action" without the owner of the transportable device being aware of, whereby further effect on suppressing wrongful use can be obtained.

In the above-described Modified Embodiment 1, the portable terminal sets a holding time according to the determined rarity of a transportable device. However, when requesting a "required action" of the user as in Modified Embodiment 1, it is not always necessary to set a holding time according to the rarity. Therefore, in the authentication/payment process of Modified Embodiment 1, the Steps S13 to S15 in which the rarity of the transportable device is determined and a holding time is set can be omitted.

Additionally, in a mode to adopt, as a "required action," an easier action if not rare (when the rarity is low, in other words the transportable device 2 is frequently used in combination with the portable terminal 100) or a more complex action if rare (when the rarity is high) according to the rarity, it is not always necessary to set a holding time. In such a case, the Step S15 can be omitted.

An embodiment relating to the above will be described below.

Embodiment 2

In Embodiment 2, when the near field communication is enabled, the portable terminal 100 presents a "required action" of the user. Then, the payment processing is executed if the "required action" on the portable terminal 100 is detected. Here, in Embodiment 2, the rarity of the transportable device is not always refereed to. FIG. 12 is a flowchart of the authentication/payment process on the portable terminal according to Embodiment 2. The following explanation will be made with reference to this figure.

First, as an operation of the user to process a payment is received by the portable terminal 100, the authentication/payment process starts.

The processing of waiting until the transportable device 2 has the near field communication enabled (Steps S11 and S12) is the same as in the above embodiment and its explanation is omitted.

As the portable terminal 100 and the transportable device 2 have the near field communication enabled (Step S12: YES), the processing of the portable terminal 100 in the mode in which setting of a holding time based on the rarity of the transportable device 2 is omitted proceeds to Step S22. Here, also in this embodiment, a holding time may be set based on the rarity of the transportable device 2.

In other words, the portable terminal 100 presents a "required action" of the user on the portable terminal 100. Specific processing details are the same as in the above Modified Embodiment 1.

Then, the portable terminal 100 determines whether the presented "required action" is executed (Step S31).

For determining whether it is within a holding time, in order words in the case of adopting an "action of performing an act within a holding time" as the "required action," the same processing as in the Step S23 of the above Modified Embodiment 1 may be executed in addition to detecting the action.

Then, if determined that the "required action" is executed (Step S31: YES), the portable terminal 100 processes the payment (Step S17). Operation in the Step S17 is the same as in Embodiment 1 and its explanation is omitted.

On the other hand, if determined that the "required action" is not executed (Step S31: NO) (Step S31: NO), the portable terminal executes the processing to reject the payment (Step S18).

For example, if the "required action" is not detected within a predetermined time limit or when the "required action" is not detected within a holding time determined by executing the same processing as in the above embodiment, the payment will be rejected.

After processing the payment (Step S17) and after performing the processing to reject the payment (Step S18), the portable terminal 100 ends the authentication/payment process.

As described above, the portable terminal 100 requires an action presented on the portable terminal 100 prior to the payment processing (Step S17), whereby it is more difficult to execute a "required action" without letting the owner of the transportable device know it, whereby effect of suppressing wrongful use can be obtained.

The portable terminal according to Embodiment 2 may also store multiple "required actions" and present a "required action" randomly selected from among them when processing a payment as in the above Modified Embodiment 1.

Here, the "required action" in Modified Embodiments 1 and 2 can be any action detectable on the portable terminal 100 or a combination thereof.

Those of changing the physical position of the portable terminal 100 such as an action of shaking the portable terminal 100, an action of tilting the portable terminal 100 in an indicated direction, an action of moving the portable terminal 100 and the transportable device 2 closer to and away from each other an indicated number of times, and the like can be used.

Such actions can be detected via an orientation sensor, a gravity sensor, an acceleration sensor, an NFC chip, and the like possessed by the portable terminal 100.

Moreover, as the "required action," actions such as clicking or tapping at a specified position or sliding or flicking in a specified direction on the touch screen 202 of the portable terminal 100 can be used.

Moreover, as the "required action," an action of the user uttering given voice may be used. Voice action can be detected via the microphone 205.

Furthermore, as the "required action," a series of actions combining the above individual actions can be used. For example, "shaking the portable terminal 100 and then double-tapping the touch screen 202" or the like can be used.

Here, if a "required action" is randomly set, a series of actions is dynamically generated and set, or a different action is set each time, it is necessary to view the action presented on the touch screen or the like of the portable terminal 100 each time, whereby it is possible to suppress mechanical wrongful use.

In Modified Embodiment 1 and 2, if an action of changing the physical position of the portable terminal 100 and a holding time (which may be a predetermined length of time or determined according to the rarity or the like of the transportable device) are combined, the payment is not processed unless the transportable device 2 and the portable terminal 100 are moved together for that length of time. Therefore, also when an action of changing the position, the orientation, and/or the tilt of the portable terminal 100 while keeping the near field communication for a specific length of time is used as a "required action," it is difficult to wrongfully use someone else's transportable device 2.

In this mode, the action of changing the position of the portable terminal 100 may be a predetermined one. For example, "shaking the portable terminal 100 for three seconds while keeping the portable terminal 100 and the transportable device 2 closer to each other" can be used as a "required action."

In this mode, since the "required action" can be a predetermined one, each time the near field communication is enabled, the processing of setting a "required action" and the processing of presenting the "required action" to the user can be omitted.

Here, the portable terminal according to the embodiments of the present disclosure is not restricted to one realized by one terminal. Multiple computers may take parts of the above functions to provide the functions as a single system comprising the multiple computers.

Preferable embodiments of the present disclosure are described above. However, the present disclosure is not confined to the specific embodiments and various modifications and changes can be made within the scope of gist of the present disclosure described in the scope of claims.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide a portable terminal for an operator to present to a payer of an electronic value that is preferable for suppressing wrongful use, a control method of the portable terminal, and the program.

REFERENCE SIGNS LIST

1 User
2 Transportable device
11 Prompter
12 Setter
13 Payment processor
100 Portable terminal
200 Terminal hardware
201 Button
202 Touch screen
203 Front camera
204 Speaker
205 Microphone
211 Marker
212 Back camera
220 Recorder
221 Payment history data
222 Holding time table
250 Transportable device
301, 302, 303, 304, 305 Message

The invention claimed is:
1. A portable terminal, comprising:
a screen;
a near field communication (NFC) chip;
at least one memory storing a program; and
at least one processor configured to access the at least one memory and operate according to the program,
the program comprising:
prompt code configured to cause the at least one processor to prompt enabling of near field communication between a transportable device and the portable terminal,
setting code configured to cause the at least one processor to, based on the near field communication being enabled, set one or more actions to the portable terminal, as a required action, that is detectable by the portable terminal prior to execution of payment of an electronic value,
presentation code configured to cause the at least one processor to present an indication of the required action on the screen, and
payment code configured to cause the at least one processor, upon detection of a performance of the required action, to accept via the NFC chip, an electronic value from an account associated with the transportable device,
wherein the portable terminal is a cellphone or a smartphone,
wherein the transportable device is a credit card or automatic teller machine (ATM) card, and
wherein the transportable device includes an electronic circuit for NFC communication.

2. The portable terminal according to claim 1, wherein the required action includes one or more actions randomly selected from among multiple predetermined candidate actions.

3. The portable terminal according to claim 1, wherein the setting code is further configured to cause the at least one processor to:
acquire identification information of the transportable device when the near field communication is enabled, and
determine a rarity value associated with a frequency of acquisition of the identification information by the portable terminal in the past,
wherein, when the rarity value is lower than a predetermined threshold, the setting code is further configured to cause the at least one processor to set an easier action as the required action.

4. The portable terminal according to claim 1, wherein the setting code is further configured to cause the at least one processor to:
acquire identification information of the transportable device when the near field communication is enabled,
determine a rarity value associated with a frequency of acquisition of the identification information by the portable terminal in the past, and
set a holding time such that the holding time is shorter when the rarity value is lower than a predetermined threshold and the holding time is longer when the rarity value is not lower than the predetermined threshold,
wherein the payment code is further configured to cause the at least one processor to authenticate the payment, based on the near field communication that is enabled between the transportable device and the portable terminal for a time duration equal to or longer than the holding time.

5. The portable terminal according to claim 1, wherein the required action includes a first action of applying a vibration to the portable terminal during the near field communication, a second action of holding the portable terminal near the transportable device for a holding time, or a third action of a tilt to the portable terminal during the near field communication.

6. The portable terminal according to claim 5, wherein the setting code is further configured to cause the at least one processor to:
acquire identification information of the transportable device when the near field communication is enabled,
determine a rarity value associated with a frequency of acquisition of the identification information by the portable terminal in the past,
set the holding time such that the holding time is shorter when the rarity value is lower than a predetermined threshold and the holding time is longer when the rarity value is not lower than the predetermined threshold,
wherein the payment code is further configured to cause the at least one processor to authenticate the payment, as a condition for receiving payment, based on the near field communication that is enabled between the transportable device and the portable terminal for a time duration equal to or longer than the holding time or based on the first action or the third action being executed within the holding time.

7. The portable terminal according to claim 4, wherein the program further comprises:

provision code configured to cause the at least one processor to provide a fee-based service to a user, wherein based on the provision code, when a purchase operation to purchase a subscription of the fee-based service by making the payment with the electronic value from the account associated with the transportable device is conducted by the user, the fee-based service is provided from a first point of time when the purchase operation is conducted until a second point of time when the holding time has elapsed.

8. The portable terminal according to claim 6, wherein the program further comprises:
provision code configured to cause the at least one processor to provide a fee-based service to a user, wherein based on the provision code, when a purchase operation to purchase a subscription of the fee-based service by making the payment from with the electronic value from the account associated with the transportable device is conducted by the user, the fee-based service is provided from a first point of time when the purchase operation is conducted until a second point of time when the holding time has elapsed.

9. The portable terminal according to claim 1, wherein the required action is a first action of moving the transportable device away from the portable terminal until the near field communication is disabled and then moving the transportable device toward the portable terminal until the near field communication is enabled again a given number of times.

10. A control method of controlling a portable terminal, the control method comprising:
prompting enabling of near field communication (NFC) between a transportable device and the portable terminal;
based on the near field communication being enabled, setting one or more actions to the portable terminal, as a required action, that is detectable by the portable terminal prior to execution of payment of an electronic value;
presenting an indication of the required action on a screen of the portable terminal; and
accepting, via an NFC chip in the portable terminal upon detection of a performance of the required action, an electronic value from an account associated with the transportable device,
wherein the portable terminal is a cellphone or a smartphone,
wherein the transportable device is a credit card or automatic teller machine (ATM) card, and
wherein the transportable device includes an electronic circuit for NFC communication.

11. The control method according to claim 10, wherein the required action includes one or more actions randomly selected from among multiple predetermined candidate actions.

12. The control method according to claim 10, further comprising:
acquiring identification information of the transportable device when the near field communication is enabled, and
determining a rarity value associated with a frequency of acquisition of the identification information by the portable terminal in the past,
wherein, when the rarity value is lower than a predetermined threshold, the setting comprises setting an easier action as the required action.

13. The control method according to claim 10, further comprising:
acquiring identification information of the transportable device when the near field communication is enabled;
determining a rarity value associated with a frequency of acquisition of the identification information by the portable terminal in the past; and
setting a holding time such that the holding time is shorter when the rarity value is lower than a predetermined threshold and the holding time is longer when the rarity value is not lower than the predetermined threshold,
the control method further comprises authenticating the payment, based on the near field communication that is enabled between the transportable device and the portable terminal for a time duration equal to or longer than the holding time.

14. The control method according to claim 10, wherein the required action includes a first action of applying a vibration to the portable terminal during the near field communication, a second action of holding the portable terminal near the transportable device for a holding time, or a third action of a tilt to the portable terminal during the near field communication.

15. The control method according to claim 14, further comprising:
acquiring identification information of the transportable device when the near field communication is enabled;
determining a rarity value associated with a frequency of acquisition of the identification information by the portable terminal in the past;
setting the holding time such that the holding time is shorter when the rarity value is lower than a predetermined threshold and the holding time is longer when the rarity value is not lower than the predetermined threshold; and
authenticating the payment based on the near field communication that is enabled between the transportable device and the portable terminal for a time duration equal to or longer than the holding time or based on the first action or the third action being executed within the holding time.

16. The control method according to claim 13, further comprising:
providing a fee-based service to a user, wherein
when a purchase operation to purchase a subscription of the fee-based service by making the payment with the electronic value from the account associated with the transportable device is conducted by the user, the fee-based service is provided from a first point of time when the purchase operation is conducted until a second point of time when the holding time has elapsed.

17. The control method according to claim 14, further comprising:
providing a fee-based service to a user, wherein
when a purchase operation to purchase a subscription of the fee-based service by making the payment with the electronic value from the account associated with the transportable device is conducted by the user, the fee-based service is provided from a first point of time when the purchase operation is conducted until a second point of time when the holding time has elapsed.

18. The control method according to claim 10, wherein the required action is a first action of moving the transportable device away from the portable terminal until the near field communication is disabled and then moving the transportable device toward the portable terminal until the near field communication is enabled again a given number of times.

19. A non-transitory computer-readable information recording medium on which a program is stored, wherein the program is configured to be executed by at least one processor of a portable terminal, wherein
the program comprises:
prompt code configured to cause the at least one processor to prompt enabling of near field communication (NFC) between a transportable device and the portable terminal,
setting code configured to cause the at least one processor to, based on the near field communication being enabled, set one or more actions to the portable terminal, as a required action, that is detectable by the portable terminal prior to execution of payment of an electronic value,
presentation code configured to cause the at least one processor to present an indication of the required action on a screen of the portable terminal, and
payment code configured to cause the at least one processor, upon detection of performance of the required action, to accept via an NFC chip of the portable terminal, an electronic value from an account associated with the transportable device,
wherein the portable terminal is a cellphone or a smartphone,
wherein the transportable device is a credit card or automatic teller machine (ATM) card, and
wherein the transportable device includes an electronic circuit for NFC communication.

* * * * *